(12) United States Patent
Zhang et al.

(10) Patent No.: US 6,919,933 B2
(45) Date of Patent: Jul. 19, 2005

(54) DISPLAY DEVICE AND METHOD OF MANUFACTURING THE SAME

(75) Inventors: Hongyong Zhang, Kawasaki (JP); Noriko Uchida, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 115 days.

(21) Appl. No.: 10/104,357

(22) Filed: Mar. 22, 2002

(65) Prior Publication Data

US 2002/0139982 A1 Oct. 3, 2002

(30) Foreign Application Priority Data

Mar. 30, 2001 (JP) ......................................... 2001-100395

(51) Int. Cl.[7] ............................................. G02F 1/136
(52) U.S. Cl. ............................... 349/43; 257/71; 257/72
(58) Field of Search ............................ 349/43; 257/71, 257/72, 59

(56) References Cited

U.S. PATENT DOCUMENTS

| | | | |
|---|---|---|---|
| 5,563,427 A | * 10/1996 | Yudasaka et al. | 257/72 |
| 6,104,041 A | * 8/2000 | Hsueh et al. | 257/59 |
| 6,137,120 A | * 10/2000 | Shindo et al. | 257/66 |
| 6,317,173 B1 | * 11/2001 | Jung et al. | 349/42 |
| 6,429,059 B2 | * 8/2002 | Yamazaki et al. | 438/158 |
| 6,590,229 B1 | * 7/2003 | Yamazaki et al. | 257/71 |
| 6,680,223 B1 | * 1/2004 | Yamazaki et al. | 438/149 |

FOREIGN PATENT DOCUMENTS

| | | |
|---|---|---|
| JP | 8-37313 | 2/1996 |
| JP | 8-148579 | 6/1996 |
| JP | 10-98192 | 4/1998 |
| JP | 2000-294798 | 10/2000 |

* cited by examiner

*Primary Examiner*—Robert H. Kim
*Assistant Examiner*—Prasad R. Akkapeddi
(74) *Attorney, Agent, or Firm*—Greer, Burns & Crain, Ltd.

(57) ABSTRACT

In a semiconductor circuit in a display device, there are provided a first gate electrode of a first MOS transistor formed on a semiconductor layer via a gate insulating film, a second gate electrode of a second MOS transistor formed on the semiconductor layer via the gate insulating film at a distance from the first gate electrode, first and second one conductivity type impurity introduced regions formed in the semiconductor layer on both sides of the first gate electrode to serve as source/drain of the first MOS transistor, and first and second opposite conductivity type impurity introduced regions formed in the semiconductor layer on both sides of the second gate electrode to serve as source/drain of the second MOS transistor. One of the first and second opposite conductivity type impurity introduced regions is formed to contact mutually to the second one conductivity type impurity introduced region.

15 Claims, 13 Drawing Sheets

DISPLAY DEVICE AND METHOD OF MANUFACTURING THE SAME

CROSS-REFERENCE TO RELATED APPLICATIONS

This application is based upon and claims priority of Japanese Patent Application No. 2001-100395, filed in Mar. 30, 2001, the contents being incorporated herein by reference.

BACKGROUND OF THE INVENTION

1. Field of the Invention

The present invention relates to a display device and a method of manufacturing the same and, more particularly, a display device in which a peripheral circuit or a signal processing circuit having the CMOS field effect transistor is built and a method of manufacturing the same.

2. Description of the Prior Art

In the active matrix liquid crystal display device in which the peripheral circuit or the signal processing circuit is built, the thin film transistors (TFTs) are employed as the CMOS transistors of the analog switch and the inverter in not only the display region but also the peripheral circuit or the signal processing circuit.

The low-temperature polysilicon technology is utilized in the thin film transistors in the peripheral circuit or the signal processing circuit like the display region.

The low-temperature crystallizing technology is indispensable to the fabrication of the high performance/low cost peripheral driving circuit TFTs. The typical crystallizing technology practically used at present is the low-temperature crystallizing method using the excimer laser. The silicon crystal thin film with good quality can be formed on the low-melting glass by using the excimer laser.

The basic forming method of crystallization by using the excimer laser will be given as follows, for example.

First, the amorphous silicon (a-Si) starting thin film is formed on the glass substrate by using the thin film forming method such as PECVD (Plasma-Enhanced CVD), etc. Then, in order to improve the laser resistant property of the starting thin film, the hydrogen in the a-Si starting thin film is removed by the thermal process at 400 to 450° C. Then, the polysilicon thin film is formed by irradiating the light beam of the excimer laser to the a-Si starting thin film to crystallize the thin film. Then, the crystallinity of the polysilicon thin film is improved by processing the polysilicon thin film in the atmosphere of the hydrogen, the steam, or the like.

By using such low-temperature polysilicon technology, not only the switching TFT array is formed in the pixel display portion but also the semiconductor integrated circuit is formed in the peripheral circuit portion. Normally the liquid crystal display device in which the peripheral circuit is built is composed of the TFT array of the pixel display portion, the gate driver circuit, and the data driver circuit. Normally, as the data driver circuit, the high performance TFTs having the operation frequency in the range of several megahertz (MHz) to several tens MHz, the field effect mobility of 50 to 300 $cm^2/Vs$, and the appropriate threshold voltage Vth are employed.

However, the request for the mobility of TFT is not so severe in the gate driver circuit and the pixel display portion. For example, the mobility of more than 20 $cm^2/Vs$ may be allowed.

In contrast, as the new technical trend of the liquid crystal display device, the ultra high-definition display panel and the high-performance built-in large-scale semiconductor circuit are intended.

First, the ultra high definition display panel will be explained hereunder.

Because of the progress of the multimedia technology and the mobile technology and the spread of the Internet, it is always needed to read/process a great deal of information. Therefore, the request for the ultra high definition display function of the liquid crystal display device as the man-machine interface is enhanced. For example, the large-size ultra high-definition display device or the mobile small-size ultra high-definition liquid crystal display device, that has 200 dpi or more, is requested in the application fields such as the multi-screen display of the home page of the Internet, the multitasking process, the CAD design, etc.

Next, the high-performance large-scale semiconductor circuit in which the liquid crystal panel is built will be explained hereunder.

The technical trend that can implement the intelligent panel or the sheet computer by providing the high-performance large-scale semiconductor integrated circuit in the peripheral circuit portion of the low-temperature polysilicon integral panel is found. For example, it is possible to built the digital driver, the data processing circuit, the memory array, the interface circuit, and CPU in the liquid crystal display panel on the data side.

The normal thin film transistors are employed as the active elements used in such peripheral circuit. The CMOS inverter using the thin film transistor in the prior art has a planar structure shown in FIG. 1A and a sectional structure shown in FIG. 1B. In this case, the insulating film is omitted from illustration in FIG. 1A, and FIG. 1B is a sectional view taken along a I—I line in FIG. 1A.

In FIG. 1A and FIG. 1B, a first polysilicon film 102 and a second polysilicon film 103 formed at a distance mutually are formed on an insulating substrate 101. Also, gate electrodes 105, 106 are formed on the first and second polysilicon films 102, 103 via a gate insulating film 104 respectively.

Also, first and second $n^+$-type impurity diffusion regions 102a, 102b are formed on the first polysilicon film 102 on both sides of the gate electrode 105. Also, first and second $p^+$-type impurity diffusion regions 103a, 103b are formed on the second polysilicon film 103 on both sides of the gate electrode 106.

Accordingly, an n-type TFT 110 is constructed by the first polysilicon film 102, the gate insulating film 104, and the gate electrode 105, and a p-type TFT 111 is constructed by the second polysilicon film 103, the gate insulating film 104, and the gate electrode 106. The n-type TFT 110 and the p-type TFT 111 are covered with a first interlayer insulating film 107.

Also, an input wiring 112 connected to two gate electrodes 105, 106 via first and second contact holes 107a, 107b, an output wiring 113 connected to the first $n^+$-type impurity diffusion region 102a and the second $p^+$-type impurity diffusion region 103b via third and fourth contact holes 107c, 107d, a power supply wiring 114 connected to the first $p^+$-type impurity diffusion region 103a via a fifth contact hole 107e, and a ground wiring 115 connected to the second $n^+$-type impurity diffusion region 102b via a sixth contact hole 107f are formed on the first interlayer insulating film 107.

The input wiring 112, the output wiring 113, the power supply wiring 114, and the ground wiring 115 are covered with a second interlayer insulating film 108.

In this case, an input signal Vin is input into the input wiring 112, an output signal Vout is output from the output wiring 113, a power supply voltage $V_{DD}$ is applied to the power supply wiring 114, and the ground wiring 115 is connected to the ground potential GND.

As described above, as the basic design rule of the CMOS circuit in the prior art, TFTs having the different conductivity type are formed on different silicon islands respectively.

By the way, the liquid crystal display panel, in which the peripheral circuit employing the low-temperature polysilicon in the prior art is built, cannot answer the need for the above technical trend because of following subjects.

In the liquid crystal display device, as the high definition display makes progress, the pixel pitch becomes small and also the peripheral circuit density becomes extremely high. It is difficult to form the ultra high-definition display panel, in which the digital driver is built and which has 200 dpi or more, by the manufacturing method in the prior art.

As the first example, in the case of the 8.4-type UXGA panel, the number of pixels is 1600 (horizontal direction)× 3×1200 (vertical direction), the display definition is 238 dpi, and the subpixel pitch is 35.5 $\mu$m. As the second example, in the case of the 15-type QXGA panel, the number of pixels is 2048 (horizontal direction)×3×1536 (vertical direction), the display definition is 171 dpi, and the subpixel pitch is 49.5 $\mu$m.

Therefore, in order to drive the pixel columns of the one vertical line, the peripheral circuit constructed by several hundreds to several thousands TFTs must be arranged in such narrow pixel pitch region.

In order to manufacture the high-performance low-temperature polysilicon intelligent panel, the sheet computer, etc., the large scale circuits such as the digital driver, the data processing circuit, the memory array, the interface circuit, the CPU, etc. must be built in the peripheral region. These large-scale integrated circuits must be arranged in the narrow frame region.

The frame of the liquid crystal panel is in the range of several mm from the edge of the glass substrate because of the requests of lightweight and compactness, and thus the panel having the frame of more than 10 mm is hardly considered. Therefore, in the case of the ultra high-definition panel having the narrow frame, it becomes difficult to built the peripheral circuit in the frame region.

Also, in order to lower the production cost of the liquid crystal panel, the multiple pattern system is employed on the large-size glass substrate having a diagonal dimension of more than 1 m. Since the size of the substrate is large, the shrinkage of the glass substrate itself is large and thus the alignment precision in the pattern formation is not high such as about 1 $\mu$m. Also, it is difficult for the existing large-size pattern forming system (the etching equipment, etc.) to form respective metal layer patterns with the working precision of less than 2 $\mu$m. Therefore, the large-scale integrated circuit must be formed in the peripheral circuit portion based on the relatively loose design rule.

However, since the positional margin to form respective TFTs 110, 111 must be considered to form a large number of TFTs 110, 111 having the configuration shown in FIGS. 1A and 1B in the narrow frame region, the number of such TFTs is limited. In addition, since the contact holes 107c to 107f are formed individually on the impurity diffusion regions 102a, 102b, 103a, 103b of respective TFTs 110, 111, the positional margin must also be assured around these contact holes 107c to 107f upon forming them, which makes the higher integration of TFTs much more difficult.

SUMMARY OF THE INVENTION

It is an object of the present invention to provide a display device in which a semiconductor circuit in a frame region of a substrate, on which a display panel is formed, can be integrated more highly than the prior art and a method of manufacturing the same.

The above subjects can be overcome by providing a display device which comprises a semiconductor layer formed on an insulating substrate like an island, a first gate electrode of a first MOS transistor formed on the semiconductor layer via a gate insulating film, a second gate electrode of a second MOS transistor formed on the semiconductor layer via the gate insulating film at a distance from the first gate electrode, first and second one conductivity type impurity introduced regions formed in the semiconductor layer on both sides of the first gate electrode to serve as source/drain of the first MOS transistor, and first and second opposite conductivity type impurity introduced regions formed in the semiconductor layer on both sides of the second gate electrode to serve as source/drain of the second MOS transistor, whereby one of the first and second opposite conductivity type impurity introduced regions is formed to contact mutually to the second one conductivity type impurity introduced region.

The above subjects can be overcome by providing a display device manufacturing method comprising the steps of forming an amorphous semiconductor layer on an insulating substrate, changing the amorphous semiconductor layer into a crystalline semiconductor layer by irradiating a laser beam onto the amorphous semiconductor layer or by annealing the amorphous semiconductor layer, patterning the crystalline semiconductor layer into an island-like shape, forming a first gate electrode of a first MOS transistor and a second gate electrode of a second MOS transistor on a first region and a second region of the island-like crystalline semiconductor layer via a gate insulating film respectively, forming first and second one conductivity type impurity introduced regions serving as source/drain of the first MOS transistor by introducing one conductivity type impurity into the first region of the crystalline semiconductor layer on both sides of the first gate electrode, forming first and second opposite conductivity type impurity introduced regions serving as source/drain of the second MOS transistor by introducing opposite conductivity type impurity into the second region of the crystalline semiconductor layer on both sides of the second gate electrode, whereby the first opposite conductivity type impurity introduced region is formed adjacently to the second one conductivity type impurity introduced region, and forming an insulating film on the first MOS transistor and the second MOS transistor, forming a first hole separately in the insulating film in the second one conductivity type impurity introduced region and the first opposite conductivity type impurity introduced region, or forming a second hole in the insulating film to extend over both the second one conductivity type impurity introduced region and the first opposite conductivity type impurity introduced region, and forming a wiring, which is connected to the second one conductivity type impurity introduced region and the first opposite conductivity type impurity introduced region via the first hole or the second hole, on the insulating film.

According to the present invention, the n-type MOS transistor and the p-type MOS transistor employed in the CMOS circuit are formed in the same island-like semiconductor layer. Therefore, the margin region required to add the impurity can be eliminated, and also the occupied area of the semiconductor circuit made of TFTs can be reduced.

In addition, since the boundary between the mutually contact impurity introduced regions of the n-type TFT and the p-type TFT is formed zigzag, the holes formed on the boundary between these impurity introduced regions are hard to deviate to one side. Therefore, the alignment margin can be reduced and thus the occupied area of the CMOS circuit can be further reduced.

Also, according to the present invention, since at least ones of the mutually adjacent impurity introducing regions of the n-type TFT and the p-type TFT formed in the same pattern region are shared to contact, the design area of the CMOS circuit can be much more reduced.

Accordingly, since the high performance/multiple function large-scale semiconductor integrated circuits such as the digital driver, DAC, the memory, the I/O circuit, the data processing circuit, CPU, etc. can be built in the ultra high-definition display device, the high performance display device can be manufactured. Also, since the semiconductor integrated circuit can be housed in the narrow peripheral frame region of the display device, the narrower frame, the lighter weight and the compactness of the display device in which the peripheral circuit is integrally formed can be achieved. In addition, even if the manufacturing equipment with the relatively low processing precision is employed, the relatively high integration density can be obtained and therefore the significant reduction in the production cost of the display device in which the peripheral circuit is integrally formed can be achieved.

DESCRIPTION OF THE PREFERRED EMBODIMENTS

Embodiments of the present invention are explained with reference to the accompanying drawings hereinafter as follows.

(First Embodiment)

In the first embodiment, a CMOS inverter and a CMOS analog switch both having a configuration, in which one n-type impurity diffusion region constituting an n-channel TFT and one p-type impurity diffusion region constituting a p-channel TFT are not separated but formed continuously and adjacently on one silicon island, will be explained hereunder.

(i) CMOS Inverter

Figure 2:
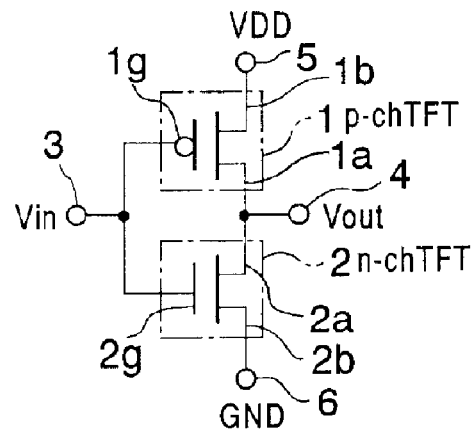
FIG. 2 is an equivalent circuit diagram showing a CMOS inverter.

FIG. 2 is an equivalent circuit diagram showing a CMOS inverter. In FIG. 2, gate electrodes 1g, 2g of a p-channel thin film transistor (p-ch TFT) 1 and an n-channel thin film transistor (n-ch TFT) 2 are connected to the same input wiring 3 respectively. Also, a second source/drain 1a of the p-ch TFT 1 and a first source/drain 2a of the n-ch TFT 2 are connected to the same output wiring 4. In addition, a first source/drain 1b of the p-ch TFT 1 is connected to a power supply wiring 5, and a second source/drain 2b of the n-ch TFT 2 is connected to a ground wiring 6.

Figure 3:
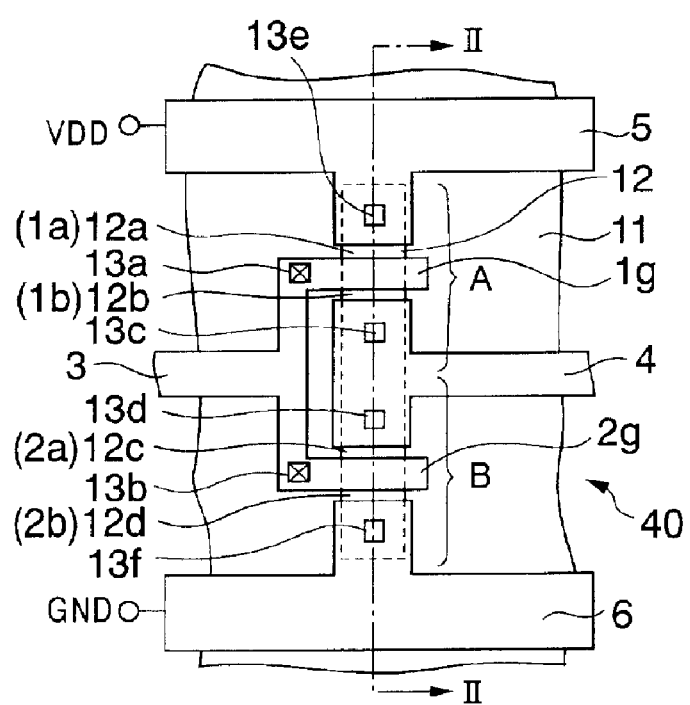
FIG. 3 is a plan view showing a CMOS inverter device according to a first embodiment of the present invention.

FIG. 3 is a plan view showing a layout of the device to achieve an equivalent circuit of the CMOS inverter shown in FIG. 2. In this case, the insulating film on the substrate is omitted from illustration in FIG. 3.

In FIG. 3, an island-like polysilicon (crystallized semiconductor) film 12 is formed on an insulating substrate 11 made of glass. The first gate electrode 1g is formed on a first region A of the polysilicon film 12 via a gate insulating film (not shown). Also, the second gate electrode 2g is formed on a second region B via the gate insulating film (not shown).

Figure 1A:
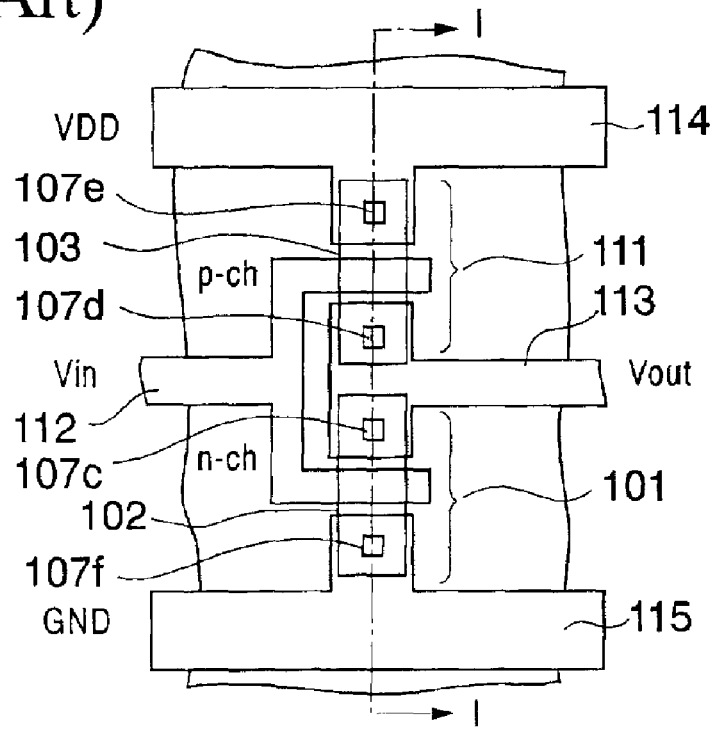
FIG. 1A is a plan view showing a semiconductor device constituting a CMOS inverter in the prior art.
Figure 1B:
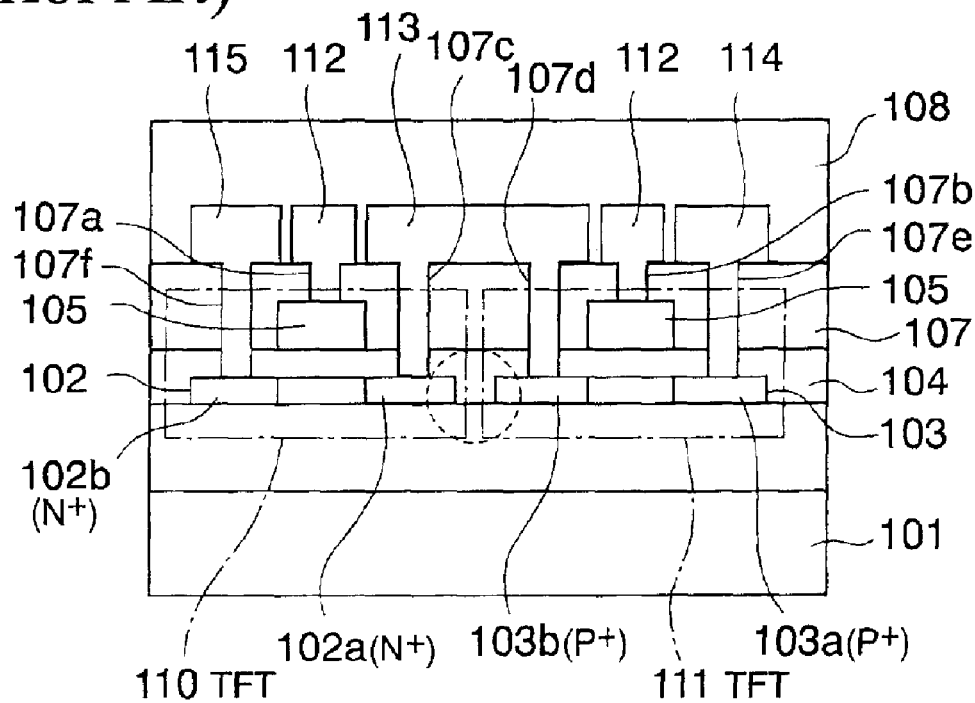
FIG. 1B is a sectional view taken along a I—I line in FIG. 1A.

In the first region A, first and second p$^+$-type impurity regions 12a, 12b are formed on the polysilicon film 12 on both sides of the first gate electrode 1g. The first and second p$^+$-type impurity regions 12a, 12b correspond to the source/drain 1b, 1a of the p-ch TFT 1 in FIG. 1, respectively. In the second region B, first and second n$^+$-type impurity regions 12c, 12d are formed on the polysilicon film 12 on both sides of the second gate electrode 2g. The first and second n$^+$-type impurity regions 12c, 12d correspond to the source/drain 2a, 2b of the n-ch TFT 2 in FIG. 1 respectively.

The second p$^+$-type impurity region 12b and the first n$^+$-type impurity region 12c are not separated but connected mutually at the boundary portion (joint portion) between the first region A and the second region B.

The p-ch TFT 1 consists of the first and second p$^+$-type impurity regions 12a, 12b and the gate electrode 1g. The n-ch TFT 2 consists of the first and second n$^+$-type impurity regions 12c, 12d and the gate electrode 2g. The p-ch TFT 1 and the n-ch TFT 2 are covered with an interlayer insulating film described later.

The input wiring 3 is connected to the first and second gate electrodes 1g, 2g via the contact holes 13a, 13b respectively. The output wiring 4 is connected mutually to the second p$^+$-type impurity region 12b and the first n$^+$-type impurity region 12c via the separate contact holes 13c, 13d respectively. In addition, the power supply wiring 5 is connected to the first p$^+$-type impurity region 12a via the contact hole 13e, and the ground wiring 6 is connected to the second n$^+$-type impurity region 12d via the contact hole 13f.

The CMOS inverter 40 consisting of the p-ch TFT 1 and the n-ch TFT 2, which are formed on such one island-like polysilicon film 12, makes it possible to reduce its occupied area rather than the prior art while suppressing the physical length.

(ii) CMOS Analog Switch

Figure 4:
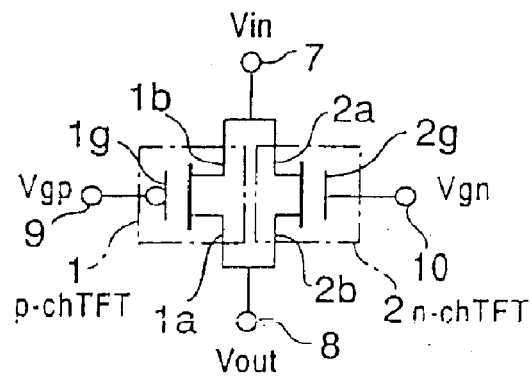
FIG. 4 is an equivalent circuit diagram showing a CMOS analog switch.

FIG. 4 is an equivalent circuit diagram showing a CMOS analog switch. In FIG. 4, the second source/drain 1b of the p-ch TFT 1 and the first source/drain 2a of the n-ch TFT 2 are connected to an input wiring 7, into which an analog tone signal Vin is input, respectively. Also, the first source/drain 1a of the p-ch TFT 1 and the second source/drain 2b of the n-ch TFT 2 are connected to an output wiring 8, which is connected to the data bus, respectively. In addition, the gate electrode 1g of the p-ch TFT 1 is connected to a first gate leading wiring 9 into which a first block selecting signal Vgp is input, and the gate electrode 2g of the n-ch TFT 2 is connected to a second gate leading wiring 10 into which a second block selecting signal Vgn is input.

Figure 5:
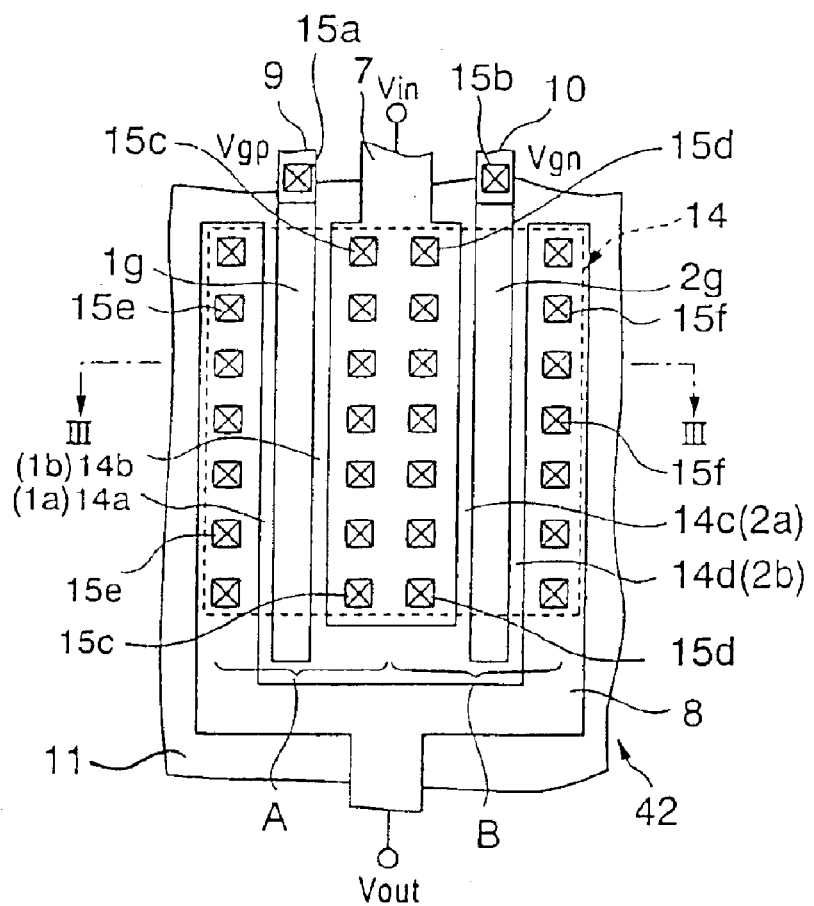
FIG. 5 is a plan view showing a CMOS analog switch according to the first embodiment of the present invention.

FIG. 5 is a plan view showing an layout of the device to achieve an equivalent circuit of the CMOS analog switch shown in FIG. 4.

In FIG. 5, an island-like polysilicon film 14 is formed on an insulating substrate 11 made of glass. The first gate electrode 1g is formed in the first region A of the polysilicon film 14 via the gate insulating film (not shown). The second gate electrode 2g is formed in the second region B of the polysilicon film 14 via the gate insulating film (not shown). Also, in the first region A, first and second p$^+$-type impurity regions 14a, 14b are formed on the polysilicon film 14 on both sides of the first gate 1g. In addition, in the second region B, first and second n$^+$-type impurity regions 14c, 14d are formed on the polysilicon film 14 on both sides of the second gate 2g. Then, the second n$^+$-type impurity region 14c and the first p$^+$-type impurity region 14b are connected mutually at the boundary portion between the first region A and the second region B.

The first and second p$^+$-type impurity regions 14a, 14b correspond to the source/drain 1a, 1b of the p-ch TFT 1 in FIG. 4 respectively. The first and second n$^+$-type impurity regions 14c, 14d correspond to the source/drain 2a, 2b of the n-ch TFT 2 in FIG. 4 respectively.

The p-ch TFT 1 consists of the first and second p$^+$-type impurity regions 14a, 14b and the first gate electrode 1g. Also, the n-ch TFT 2 consists of the first and second n$^+$-type impurity regions 14c, 14d and the second gate electrode 2g.

A first gate leading wiring 9 is connected to the first gate electrode 1g via a contact hole 15a, and a second gate leading wiring 10 is connected to the second gate electrode 2g via a contact hole 15b. Also, an input wiring 7 is connected to the second p$^+$-type impurity region 14b and the first n$^+$-type impurity region 14c, both positioned adjacently, via separate contact holes 15c, 15d. In this case, the contact hole 15c formed on the second p$^+$-type impurity region 14b and the contact hole 15d formed on the first n$^+$-type impurity region 14c are formed at plural locations. In addition, the output wiring 8 is connected to the first p$^+$-type impurity region 14a and the second n$^+$-type impurity region 14d, which are located on both sides of the island-like polysilicon film 14, via separate contact holes 15e, 15f respectively.

The CMOS analog switch 42 consisting of the p-ch TFT 1 and the n-ch TFT 2, which are formed on such one island-like polysilicon film 14, makes it possible to reduce its occupied area rather than the prior art while suppressing the physical lateral width.

(iii) CMOS TFT Manufacturing Steps

The CMOS TFT applied to either the CMOS inverter 40 shown in FIG. 3 or the CMOS analog switch 42 shown in FIG. 5 will be formed via following steps.

FIGS. 6A to 6J are sectional views showing steps of forming the CMOS TFT and the wiring, which are viewed from a II—II line in FIG. 3 or a III—III line in FIG. 5.

Figure 6A:
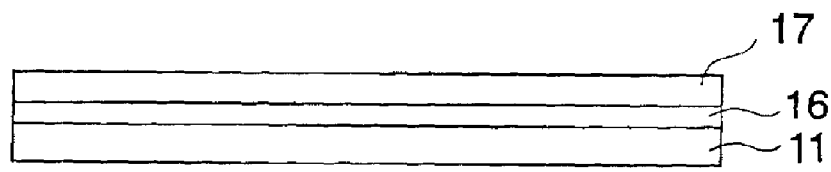
FIGS. 6A to 6J are sectional views showing steps of manufacturing a CMOS TFT employed in the first embodiment of the present invention.

First, as shown in FIG. 6A, $SiO_2$ of 200 to 300 nm thickness is formed as an underlying insulating film 16 on the insulating substrate 11, that is made of glass or resin film, by the plasma-enhanced CVD (PECVD) method. As the underlying insulating film 16, a double-layered structure consisting of silicon nitride ($SiN_x$; x is component number) film of 50 nm thickness and the $SiO_2$ film of 50 nm thickness may be constructed.

Then, an intrinsic amorphous silicon (a-Si) film 17 of 30 to 50 nm thickness is formed on the underlying insulating film 16 by the PECVD method. The p-type impurity or the n-type impurity may be added to the a-Si film 17 to adjust the threshold voltage of TFT in forming the a-Si film 17 or after the film formation.

Figure 6B:
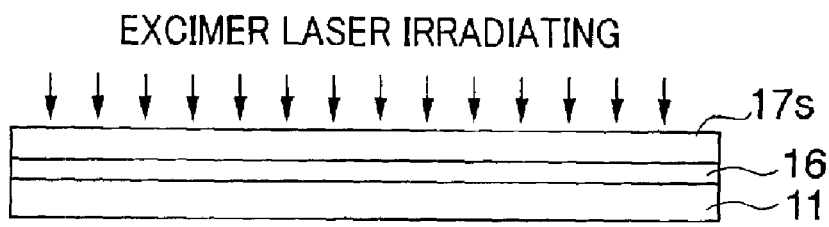

Then, as shown in FIG. 6B, the a-Si film 17 is crystallized by irradiating the excimer laser beam onto the a-Si film 17 and is changed into a polysilicon (poly-Si) film 17s.

As the excimer laser beam, the XeCl excimer laser whose wavelength is 308 nm is employed, the beam emitted from the laser oscillator is shaped into the rectangular beam having a width of 0.1 to 1.0 mm and a length of 200 to 1000 mm, i.e., the linear beam, by controlling the optical system, and this linear beam is irradiated onto the a-Si film to scan. In the first embodiment, the scanning direction of the laser beam is controlled so as to intersect orthogonally with the drain current flowing direction of TFT. If in this manner, the generation of the stripped pattern in the polysilicon film 17s due to the laser beam scan can be relaxed and the variation in crystallinity can be suppressed, so that the yield and the display performance can be improved.

Figure 6C:
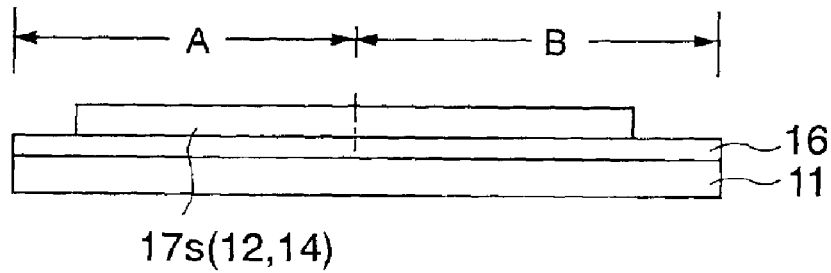

Then, as shown in FIG. 6C, an island-like resist pattern (not shown) in which two TFTs can be formed is formed on the polysilicon film 17s. Then, the polysilicon film 17s is shaped into the island by etching the polysilicon film 17s while using this resist pattern as a mask. Then, this the polysilicon film 17s is used as the semiconductor active layer.

The polysilicon film 17s shaped into the island corresponds to the polysilicon films 12, 14 shown in FIG. 3 and FIG. 5. If the CMOS inverter 40 is to be formed, a planar shape of the polysilicon film 17s has a length of 4 to 6 µm in the direction along which the current flows and a length (width) of 10 to 100 µm in the direction which is perpendicular to the current direction. Also, if the CMOS analog switch 42 is to be formed, a planar shape of the polysilicon film 17s has a length of 4 to 6 µm in the direction along which the current flows and a length (width) of 10 to 100 µm in the direction which is perpendicular to the current direction.

In the polysilicon film 17s in the first embodiment, the first region A in which the p-ch TFT is formed and the second region B in which the n-ch TFT is formed are not separated mutually but formed continuously as the common island. If the polysilicon film 17s formed as such common island is employed, the integration density of the CMOS circuit can be enhanced more highly as described later.

Figure 6D:
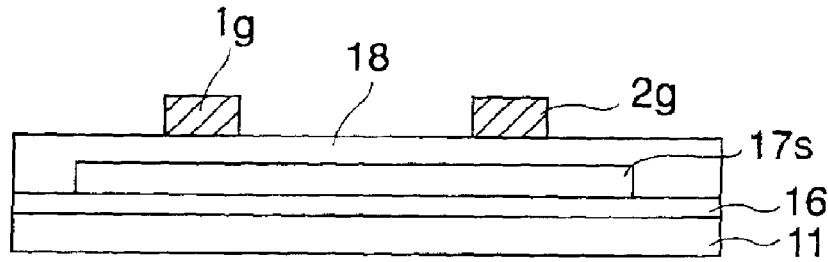

Then, as shown in FIG. 6D, the $SiO_2$ film of 80 to 150 nm thickness is formed as a gate insulating film 18 on the underlying insulating film 16 containing the island-like polysilicon film 17s by the PECVD method. As the gate insulating film 18, a double-layered structure consisting of the $SiO_2$ film and the $SiN_x$ film may be employed. In this case, it is desired that a thickness of the $SiN_x$ film serving as the lower layer should be set to less than ⅓ of the total thickness of the gate insulating film 18.

Then, as shown in FIG. 6D, an aluminum alloy (AlNd) film which acts as the gate electrode and into which neodymium is added is formed on the gate insulating film 18 by the DC/RF sputter equipment to have a thickness of 300 to 400 nm. As the material of the gate electrode, the metal film except the aluminum alloy or the polysilicon film into which the impurity is added may be employed.

Then, the photoresist (not shown) is coated on the aluminum alloy film, and then shaped into shapes of a predetermined gate electrode pattern and a wiring pattern by exposing/developing such photoresist. Then, the AlNd film is etched by using the photoresist as a mask, and thus the first gate electrode 1g, the second gate electrode 2g, and the wiring (not shown), all made of the AlNd film, are formed.

The first gate electrode 1g is formed in the portion that passes through the center of the first region A of the polysilicon film 17s. Also, the second gate electrode 2g is formed in the portion that passes through the center of the second region B of the polysilicon film 17s. Then, the photoresist is removed.

Figure 6E:
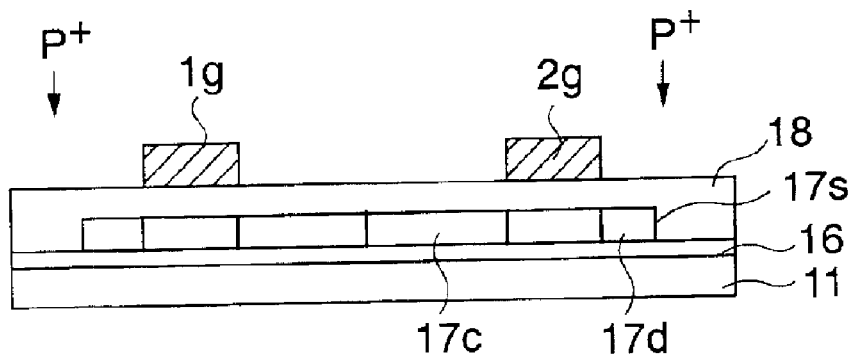
Figure 6F:
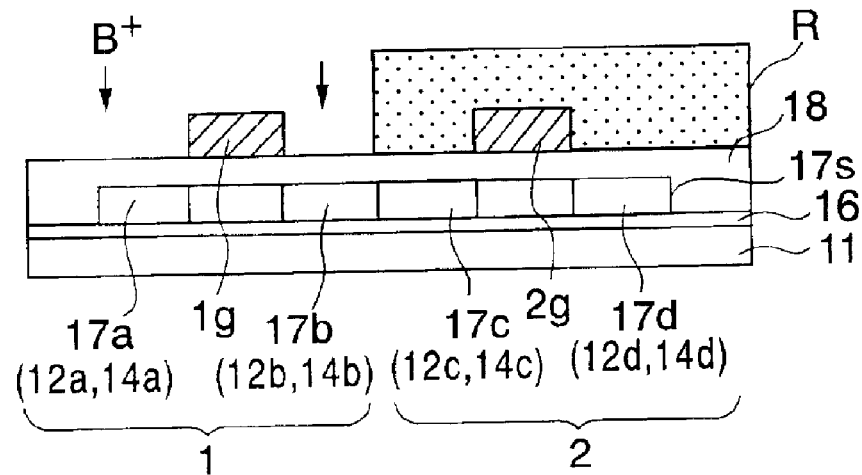

Then, as shown in FIG. 6E, the n-type impurity is introduced into the overall surface of the substrate by using the first and second gate electrodes 1g, 2g as a mask. Then, as shown in FIG. 6F, if the p-type impurity is selectively introduced only into the first region A at the high concentration while using the first gate electrode 1g as a mask in the situation that the second region B is covered with the photoresist (mask) R, first and second $p^+$-type impurity regions 17a, 17b are formed on the polysilicon film 17s on both sides of the first gate electrode 1g by using the first photoresist and also first and second $n^+$-type impurity regions 17c, 17d are formed on the polysilicon film 17s on both sides of the second gate electrode 2g.

The introduction of the impurity into the polysilicon film 17s is carried out by the plasma doping method or the ion-implanting method. Phosphorus (P), arsenic (As), or the like is introduced as the n-type impurity, and boron (B), or the like is introduced as the p-type impurity. The p-type impurity concentration of the $p^+$-type impurity regions 17a, 17b is substantially in excess of $1 \times 10^{19}/cm^3$, and the n-type impurity concentration of the $n^+$-type impurity regions 17c, 17d is in excess of $1 \times 10^{19}/cm^3$.

Then, the p-type impurity and the n-type impurity that have been introduced into the polysilicon film 17s are activated by the excimer laser. As the approach of activating the impurity, the annealing process at more than 300° C. or the lamp heating process may be employed.

The first and second $p^+$-type impurity regions 17a, 17b correspond to the first and second $p^+$-type impurity regions 12a, 12b shown in FIG. 3 or the first and second $p^+$-type impurity regions 14a, 14b shown in FIG. 5. Also, the first and second $n^+$-type impurity regions 17c, 17d correspond to the first and second $n^+$-type impurity regions 12c, 12d shown in FIG. 3 or the first and second $n^+$-type impurity regions 14c, 14d shown in FIG. 5.

Accordingly, the p-ch TFT 1 is composed of the first gate electrode 1g, the gate insulating film 18, and the $p^+$-type impurity regions 17a, 17b, and the n-ch TFT 2 is composed of the second gate electrode 2g, the gate insulating film 18, and the $n^+$-type impurity regions 17c, 17d.

Figure 6G:
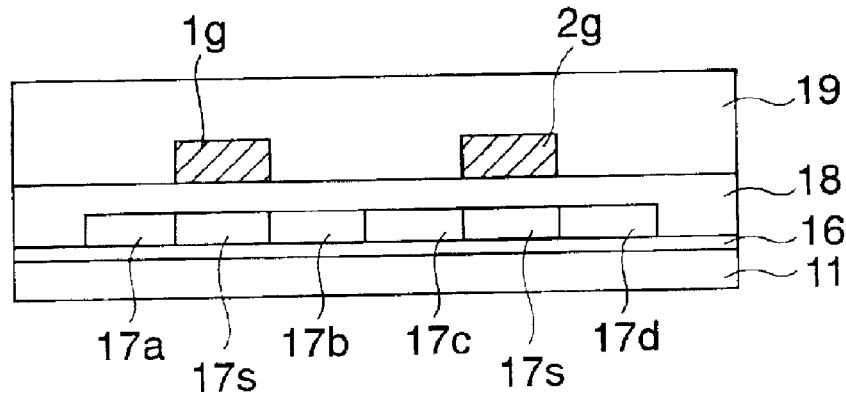

Then, as shown in FIG. 6G, the $SiO_2$ film and the $SiN_x$ film are formed as a first interlayer insulating film 19 on the overall upper surface of the substrate by the PECVD method. In the first embodiment, respective thicknesses of the $SiO_2$ film and the $SiN_x$ film are set to 60 nm and 400 nm. As the first interlayer insulating film 19, one of the $SiO_2$ film and the $SiN_x$ film, the organic resin film, or the like may be formed.

Figure 6H:
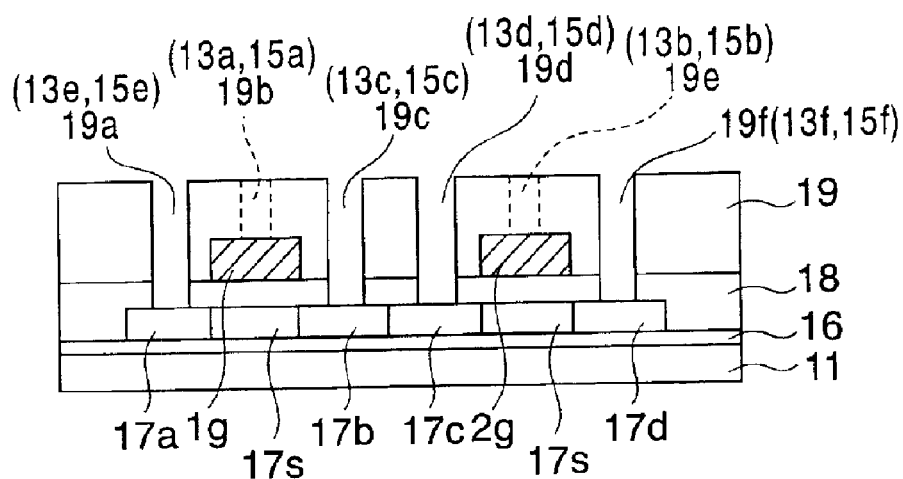

Then, the resist pattern (not shown) in which a contact window is opened is formed on the first interlayer insulating film 19, and then the first interlayer insulating film 19 is etched by dry etching while using the resist pattern as a mask. Accordingly, as shown in FIG. 6H, first to sixth contact holes 19a to 19f are formed independently on the first and second $p^+$-type impurity regions 17a, 17b, the first and second $n^+$-type impurity regions 17c, 17d, and the first and second gate electrodes 1g, 2g respectively.

The first contact hole 19a corresponds to the contact holes 13e, 15e on the first $p^+$-type impurity regions 12a, 14a shown in FIG. 3 and FIG. 5. The second contact hole 19b corresponds to the contact holes 13a, 15a on the first gate electrode 1g shown in FIG. 3 and FIG. 5. The third contact hole 19c corresponds to the contact holes 13c, 15c on the second $p^+$-type impurity regions 12b, 14b shown in FIG. 3 and FIG. 5. The fourth contact hole 19d corresponds to the contact holes 13d, 15d on the first $n^+$-type impurity regions 12c, 14c shown in FIG. 3 and FIG. 5. The fifth contact hole 19e corresponds to the contact holes 13b, 15b on the second gate electrode 2g shown in FIG. 3 and FIG. 5. The sixth contact hole 19f corresponds to the contact holes 13f, 15f on the second $n^+$-type impurity regions 12d, 14d shown in FIG. 3 and FIG. 5.

Figure 6I:
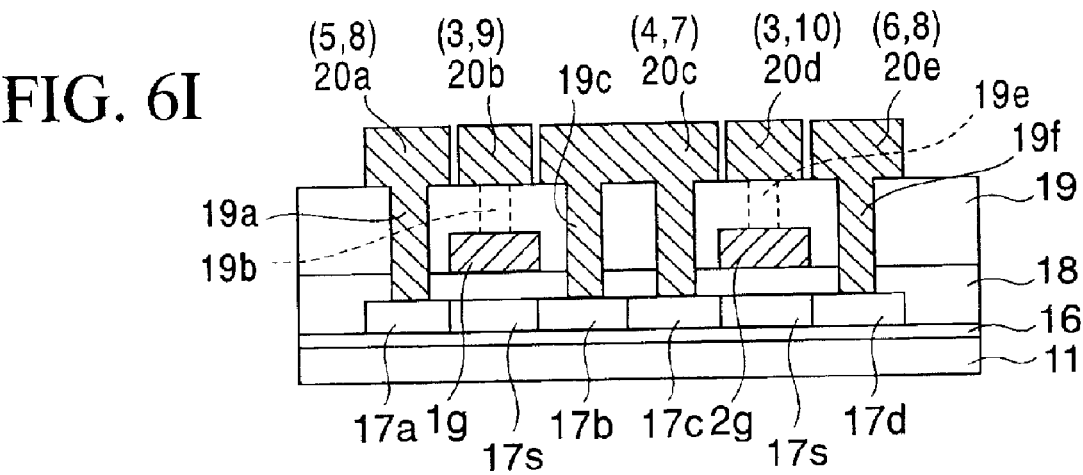
Figure 6J:
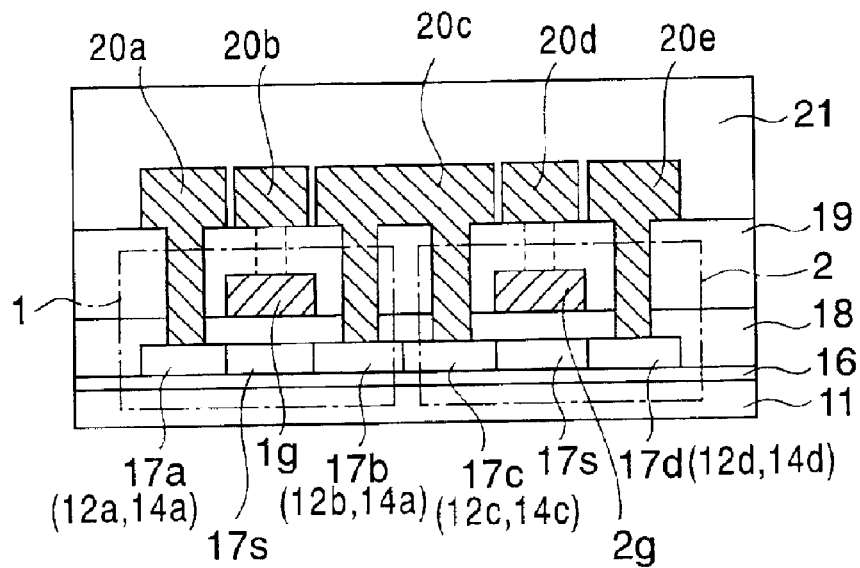

Then, a metal film having a triple-layered structure consisting of titanium/aluminum/titanium is formed on the first interlayer insulating film 19 and in the first to sixth contact holes 19a to 19f by the DC/RF sputter to have thicknesses of 100/300/50 nm respectively. Then, a resist pattern (not shown) having predetermined wiring patterns is formed on the metal film having the triple-layered structure, and then first to fifth predetermined wirings 20a to 20e are formed by dry-etching the metal film having the triple-layered structure while using the resist pattern as a mask. FIG. 6I shows the state that the resist pattern is removed.

The first wiring 20a corresponds to the power supply wiring 5 shown in FIG. 3 or the output wiring 8 shown in FIG. 5, and is connected to the first $p^+$-type impurity region 17a via the first contact hole 19a. The second wiring 20b corresponds to the input wiring 3 shown in FIG. 3 or the first gate leading wiring 9 shown in FIG. 5, and is connected to the first gate electrode 1g via the second contact hole 19b. The third wiring 20c corresponds to the output wiring 4 shown in FIG. 3 or the input wiring 7 shown in FIG. 5, and is connected to the second $p^+$-type impurity region 17b and the first $n^+$-type impurity region 17c via the third and fourth contact holes 19c, 19d. The fourth wiring 20d corresponds to the input wiring 3 shown in FIG. 3 or the second gate leading wiring 10 shown in FIG. 5, and is connected to the second gate electrode 2g via the fifth contact hole 19e. The fifth wiring 20e corresponds to the ground wiring 6 shown in FIG. 3 or the output wiring 8 shown in FIG. 5, and is connected to the second $n^+$-type impurity region 17d via the sixth contact hole 19f.

After the first to fifth wirings 20a to 20e are formed as described above, as shown in FIG. 6J, a second interlayer insulating film 21 for covering the first to fifth wirings 20a to 20e is formed on the overall upper surface of the first interlayer insulating film 19. In the first embodiment, the acrylic resin of 3000 nm thickness is formed as the second interlayer insulating film 21 to get the flat surface. As the second interlayer insulating film 21, the $SiO_2$ film or the $SiN_x$ film, or other resinous insulating film may be formed.

With the above, the first embodiment is explained by using the example in which the CMOS TFT is formed on the insulating substrate 11. It is of course that the structure of the present invention can be applied to the CMOS SOI (Silicon-On-Insulator) field effect transistor using the single crystal silicon, or the semiconductor integrated circuit formed by using such transistors.

As described above, according to the first embodiment of the present invention, the silicon island regions in which the p-ch TFT and the n-ch TFT constituting the CMOS TFT are to be formed are not separated but formed continuously, and thus the $n^+$-type impurity regions and the $p^+$-type impurity regions are formed in the same silicon island region. Therefore, the occupied areas of the inverter and the analog switch as the basic elements of the CMOS circuit can be reduced rather than the prior art.

As a result, the occupied areas of the CMOS digital circuits or the CMOS analog circuits, that consist of the inverter and the analog switch, can be reduced, and thus the higher density TFT integrated circuit can be constructed by the same design rule as the prior art.

(Second Embodiment)

In a second embodiment, a CMOS TFT having such a configuration that mutually neighboring source/drain regions of the p-channel thin film transistor and the n-channel thin film transistor are formed continuously not to leave a space between them and neighboring n-type source/drain and p-type source/drain are connected to the same wiring via one contact hole will be explained hereunder.

Figure 7:
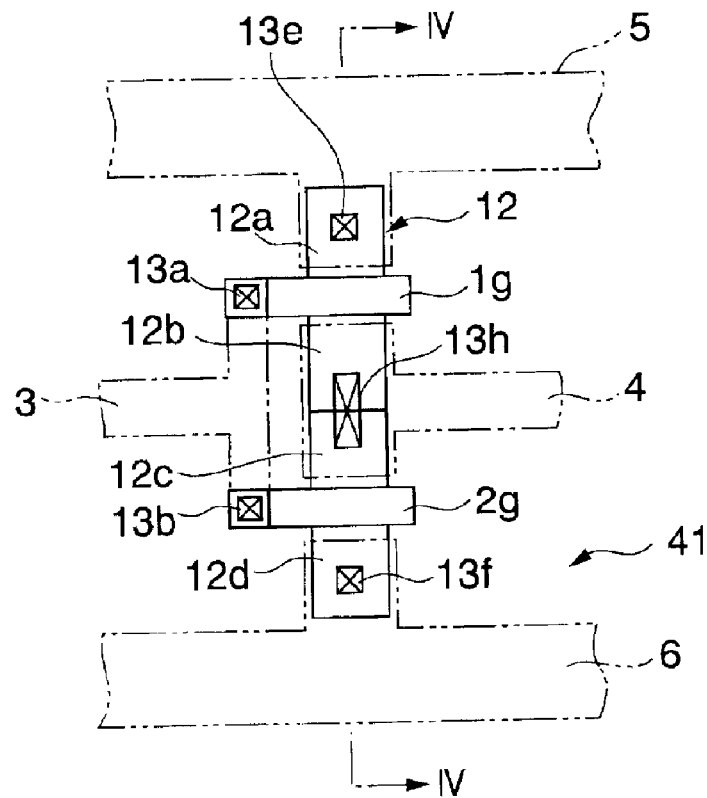
FIG. 7 is a plan view showing a CMOS inverter according to a second embodiment of the present invention.
Figure 8:
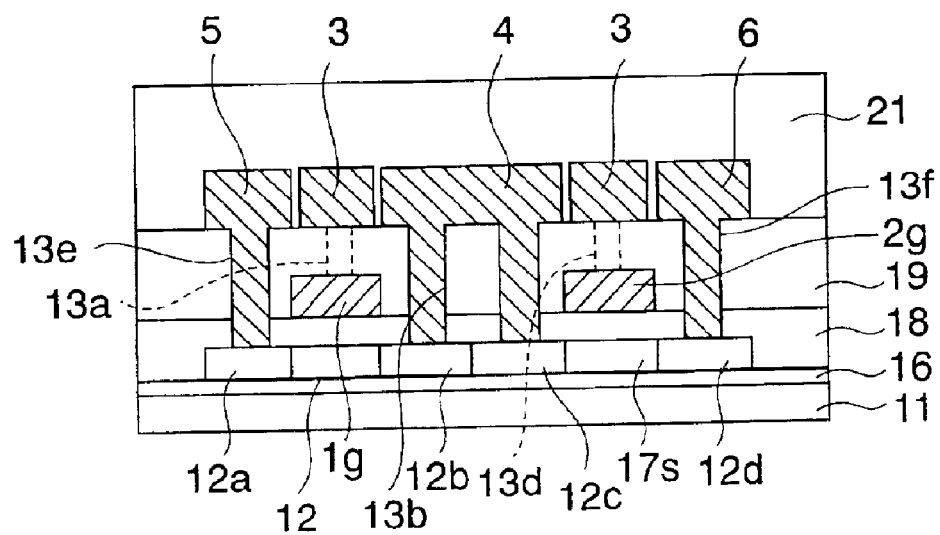
FIG. 8 is a sectional view showing the CMOS inverter according to the second embodiment of the present invention.

FIG. 7 is a plan view showing a layout of a CMOS inverter according to a second embodiment of the present invention, and FIG. 8 is a sectional view taken along a IV—IV line in FIG. 7. In FIG. 7 and FIG. 8, the same references as those in FIG. 3 and FIG. 6J denote the same elements.

A CMOS inverter 41 in FIG. 7 employs the p-ch TFT 1 and the n-ch TFT 2 disclosed in the first embodiment, and has such a configuration that a contact hole 13h is formed at the boundary portion between a second $p^+$-type impurity region 12b serving as one source/drain of the p-ch TFT 1 and a first $n^+$-type impurity region 12c serving as one source/drain of the n-ch TFT 2 and its peripheral portion and also the output wiring 4 is connected to the second $p^+$-type impurity region 12b and the first $n^+$-type impurity region 12c via the contact hole 13h.

According to this, the second $p^+$-type impurity region 12b of the p-ch TFT 1 and the first $n^+$-type impurity region 12c of the n-ch TFT 2, which constitute the CMOS inverter 41, are formed continuously not to separate mutually and also the number of the contact portion between these impurity regions 12b, 12c and the output wiring 4 is one. Therefore, since the margin necessary for the formation of the contact hole can be reduced smaller than the first embodiment, a height of the CMOS inverter 41 circuit can be further suppressed rather than the first embodiment. In addition, since the connected portion of the output wiring 4 to the second $p^+$-type impurity region 12b and the first $n^+$-type impurity region 12c is the semiconductor layer-metal ohmic contact, the small contact resistance can be obtained.

Figure 9:
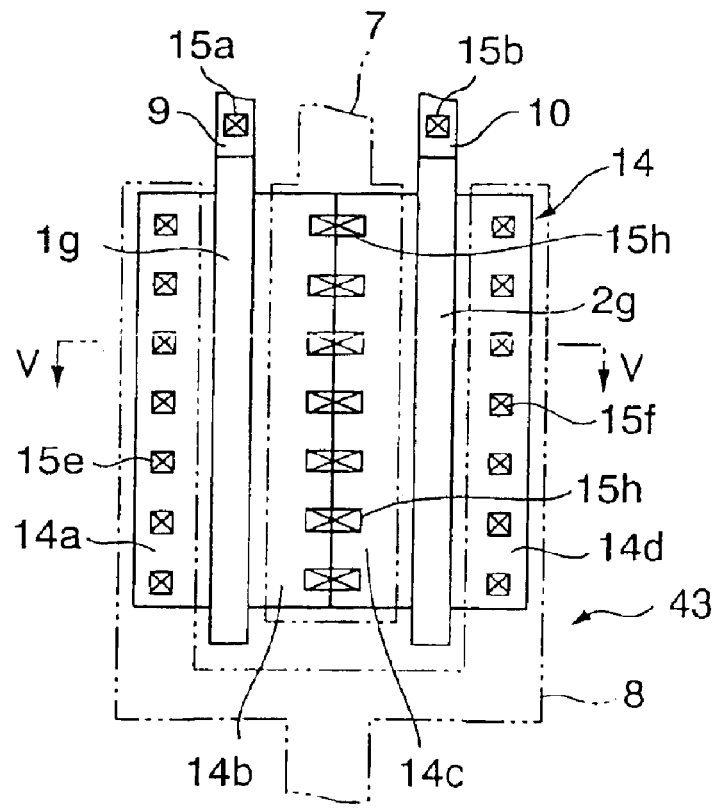
FIG. 9 is a plan view showing a CMOS analog switch according to the second embodiment of the present invention.
Figure 10:
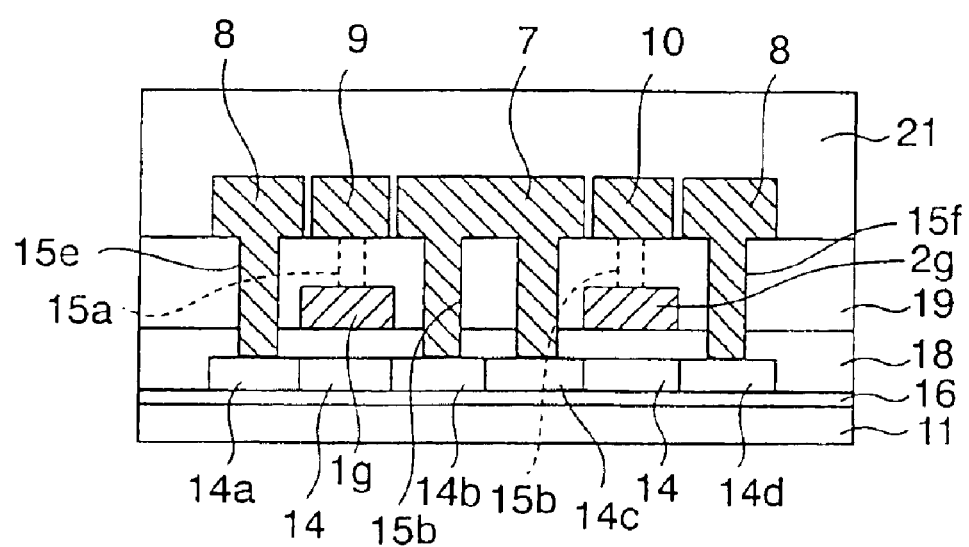
FIG. 10 is a sectional view showing the CMOS analog switch according to the second embodiment of the present invention.

FIG. 9 is a plan view showing a layout of a CMOS analog switch according to the second embodiment of the present invention, and FIG. 10 is a sectional view taken along a V—V line in FIG. 9. In FIG. 9 and FIG. 10, the same references as those in FIG. 5 and FIG. 6J denote the same elements.

A CMOS analog switch 43 in FIG. 9 employs the p-ch TFT 1 and the n-ch TFT 2 disclosed in the first embodiment, and has such a configuration that a contact hole 15h is formed at the boundary portion between a second $p^+$-type impurity region 14b serving as one source/drain of the p-ch TFT 1 and a first $n^+$-type impurity region 14c serving as one source/drain of the n-ch TFT 2 and its peripheral portion and also the input wiring 7 is connected to the second $p^+$-type impurity region 14b and the first $n^+$-type impurity region 14c via the contact hole 15h.

According to this, the second $p^+$-type impurity region 14b of the p-ch TFT 1 and the first $n^+$-type impurity region 14c of the n-ch TFT 2, which constitute the CMOS analog switch 43, are formed continuously not to separate mutually and also the number of the contact portion between these impurity regions 14b, 14c and the input wiring 7 is one in the current direction. Therefore, since the margin necessary for the formation of the contact hole can be reduced smaller than the first embodiment, a lateral width of the CMOS analog switch 43 can be further suppressed rather than the first embodiment. In addition, since the connected portion of the output wiring 7 to the second $p^+$-type impurity region 14b and the first $n^+$-type impurity region 14c is the semiconductor layer-metal ohmic contact, the small contact resistance can be obtained.

In FIG. 9, a plurality of contact holes 15h are formed on the boundary line between the second $p^+$-type impurity region 14b and the first $n^+$-type impurity region 14c. In this case, these contact holes 15h may be formed as one long and narrow slit-like contact hole.

The steps of forming the CMOS inverter and the CMOS analog switch in the second embodiment are similar to those in the first embodiment except the contact hole forming position at the boundary portion between the mutually neighboring $p^+$-type impurity region and $n^+$-type impurity region and its peripheral portion.

(Third Embodiment)

In a third embodiment, a CMOS analog switch having such a configuration that mutually neighboring source/drain regions of the p-channel thin film transistor and the n-channel thin film transistor are formed continuously not to leave a space between them and contact portions of the n-type source/drain and contact portions of the p-type source/drain are aligned on a straight line by arranging zigzag the boundary portions (joint portions) between neighboring n-type source/drain and p-type source/drain will be explained hereunder.

Figure 11:
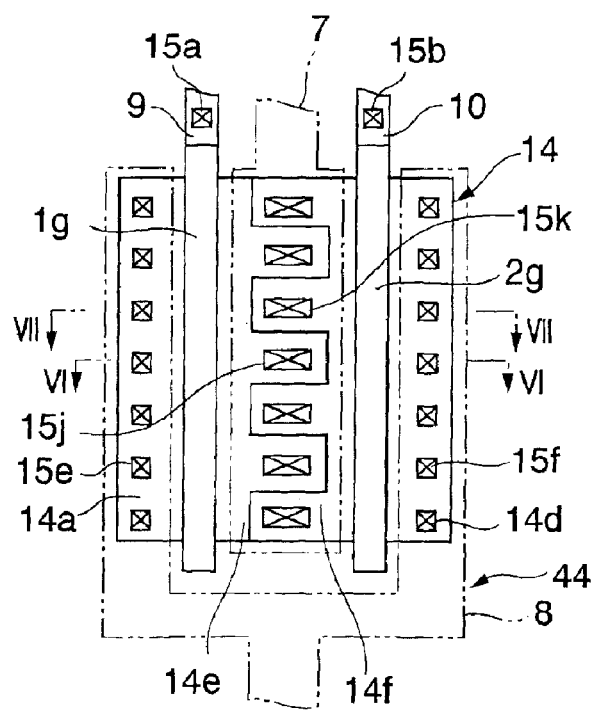
FIG. 11 is a plan view showing a CMOS analog switch according to a third embodiment of the present invention.
Figure 12A:
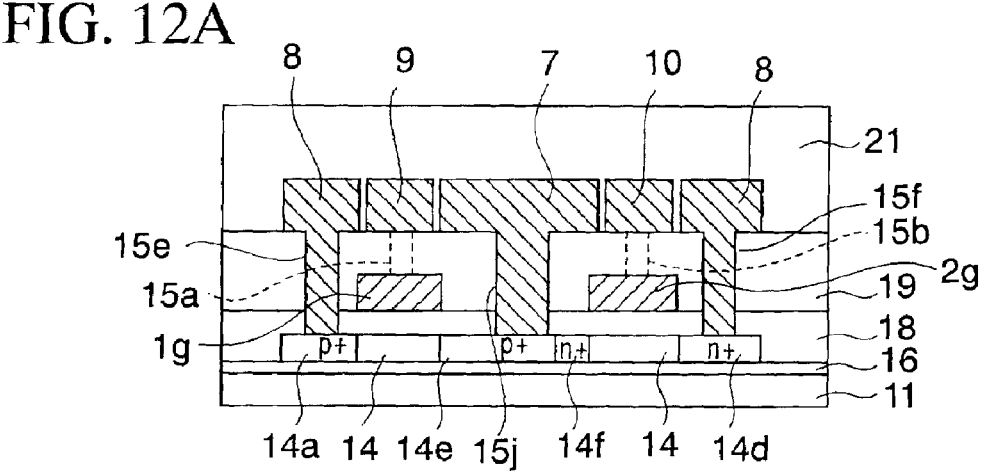
FIGS. 12A and 12B are sectional views showing the CMOS analog switch according to the third embodiment of the present invention.
Figure 12B:
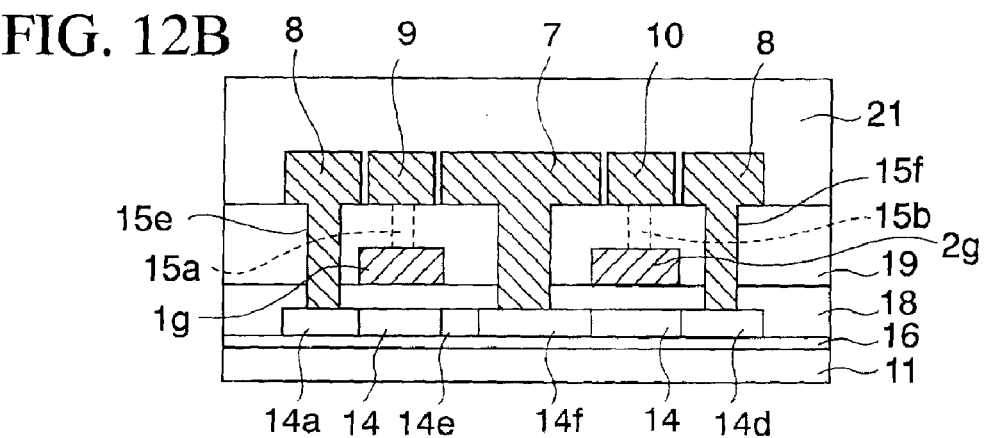

FIG. 11 is a plan view showing a layout of a CMOS analog switch according to the third embodiment of the present invention, FIG. 12A is a sectional view taken along a VI—VI line in FIG. 11, and FIG. 12B is a sectional view taken along a VII—VII line in FIG. 11. In FIG. 11 and FIG. 12, the same references as those in FIG. 5 and FIG. 6J denote the same elements.

In order to flow the large current, the polysilicon film 14 of the p-ch TFT 1 and the n-ch TFT 2, which constitute CMOS analog switch, is formed long in the direction perpendicular to the current direction in contrast to the polysilicon film 12 of the CMOS inverter.

Therefore, as shown in FIG. 11, a second p+-type impurity region 14e and a first n+-type impurity region 14f, which are located adjacently in the region between two gate electrodes 1g, 2g of the CMOS analog switch 44, are arranged alternatively in the direction perpendicular to the current direction. In other words, the shape of the boundary portion (joint portion) between the second p+-type impurity region 14e and the first n+-type impurity region 14f is formed like the teeth of comb along the extending direction of the gate electrodes 1g, 2g. Such shape can be easily formed by shaping the edge of the photoresist R in FIG. 6F, which is used to dope the p-type impurity into the polysilicon film 14, into the shape like the teeth of comb, which is obtained by connecting the S-shapes successively when viewed from the top.

Also, contact holes 15j, 15k are formed on a plurality of alternatively-interlaced projected portions of the second p+-type impurity region 14e and the first n+-type impurity region 14f of the first interlayer insulating film 19 respectively such that they are aligned in almost parallel with the gate electrodes 1g, 2g.

Then, the input wiring 7 is ohmic-connected to the second p+-type impurity region 14e and the first n+-type impurity region 14f via these contact holes 15j, 15k.

The most striking feature of the third embodiment resides in that the second p+-type impurity region 14e of the p-ch TFT 1 and the first n+-type impurity region 14f of the n-ch TFT 2 are arranged alternatively near the boundary in one direction in the region put between the gate electrodes 1g, 2g of both TFTs 1, 2 such that two type ohmic contacts such as the n+-type semiconductor-metal and the p+-type semiconductor-metal can be formed linearly.

Accordingly, the portion in which only the p+-type impurity region 14e and the metal input wiring 7 are ohmic-connected, as shown in FIG. 12A, and the portion in which only the n+-type impurity region 14f and the metal input wiring 7 are ohmic-connected, as shown in FIG. 12B, are formed.

In this manner, the physical width of the CMOS analog switch can be reduced rather than the two-column contact configuration shown in FIG. 5, and thus the occupied area can be reduced much more.

By the way, in the CMOS analog switch 44 shown in FIG. 11, both the total number of the contact holes between the p+-type impurity region 14e and the input wiring 7 and the total number of the contact holes between the n+-type impurity region 14f and the input wiring 7 are reduced rather than the CMOS analog switch 42 shown in FIG. 5. Therefore, the CMOS analog switch 44 has a fear for the reduction in the ON current and the increase in the ON resistance because of the increase in the contact resistance and the bulk resistance.

However, as results of the TEG design/evaluation of a plurality of CMOS analog switches that verify the present invention, the inventors of the present invention have found that the reduction in the ON current and the increase in the ON resistance do not appear in the element shown in FIG. 11 in contrast to the element shown in FIG. 5. Therefore, the above fear can be overcome.

Figure 13:
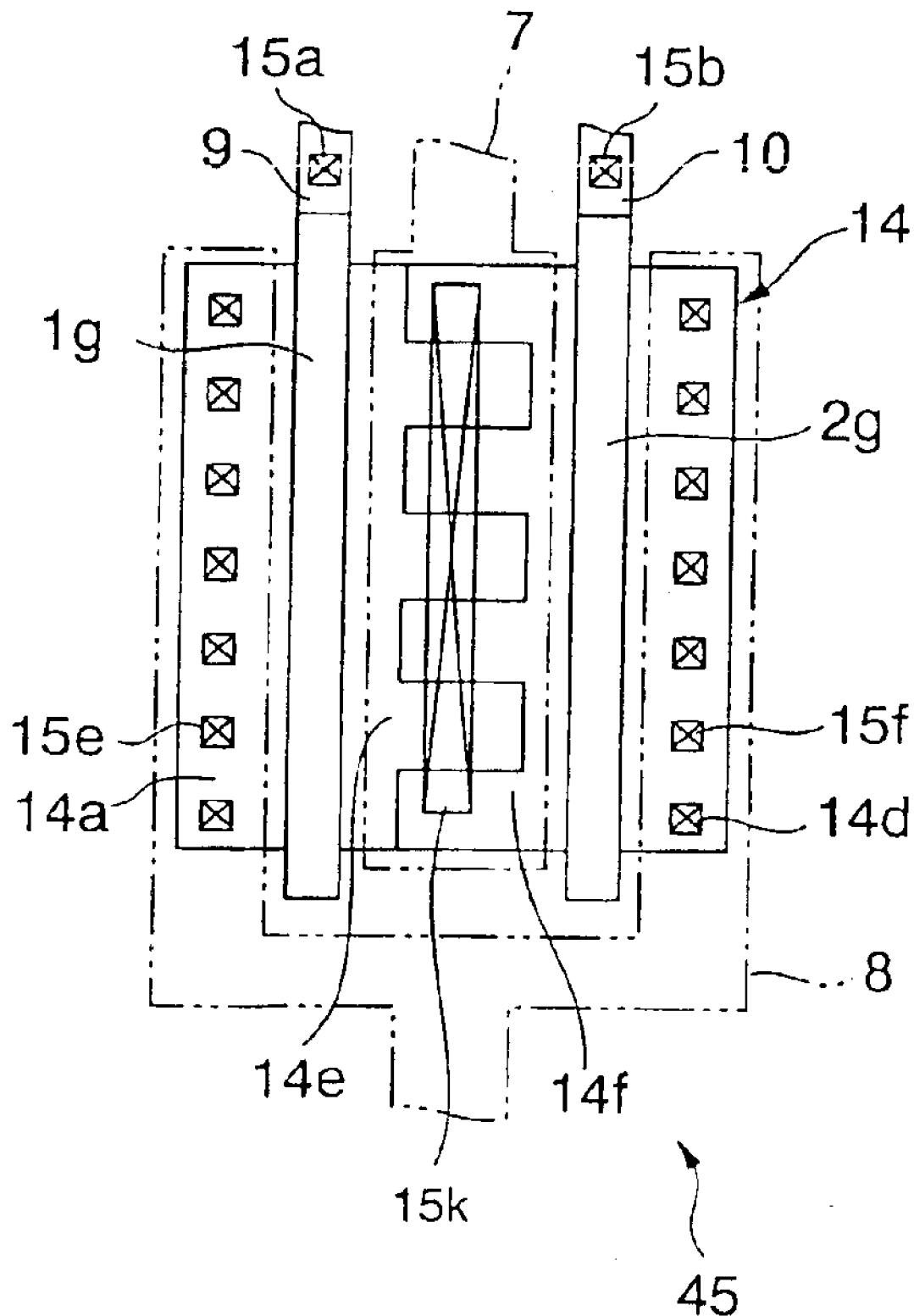
FIG. 13 is a plan view showing another CMOS analog switch according to the third embodiment of the present invention.

FIG. 13 is another CMOS analog switch 45 obtained by varying the element in FIG. 11. As the most striking feature of the present variation, there is shown such a configuration that one long and narrow slit-like contact hole 15k is formed in the first interlayer insulating film 19 in the region, in which the second p+-type impurity region 14e of the p-ch TFT 1 and the first n+-type impurity region 14f of the n-ch TFT 2 are arranged alternatively, in the direction parallel with the extending direction of the gate electrodes 1g, 2g and that the input wiring 7 is ohmic-connected to both the second p+-type impurity region 14e and the first n+-type impurity region 14f via the slit-like contact hole 15k.

In this manner, if the contact holes are not provided individually in the projected regions at the boundary between the second p+-type impurity region 14e and the second p+-type impurity region 14e but one slit-like contact hole 15k is provided, not only the contact resistance can be reduced but also there is no need that the processing margin should be taken into account to prevent the deviation from the linear boundary line, as shown in FIG. 11. Therefore, the effective contact area of the contact hole 15k can be reduced and also the further miniaturization can be achieved.

In the third embodiment, the same effects and advantages as those in the first and second embodiments can also be achieved. Also, the formation of the CMOS inverter and the CMOS analog switch in the third embodiment is similar to the first embodiment except the step of forming the boundary between the p+-type impurity region and the n+-type impurity region, that are located mutually adjacently, and the forming position of the contact holes.

(Fourth Embodiment)

In a fourth embodiment, particular applications of the CMOS TFT shown in the first to third embodiments will be explained hereunder. Here, the ultra high-definition liquid crystal display device in which the low-temperature polysilicon peripheral circuit is integrally formed is exemplified. However, the CMOS TFT can be similarly applied to the active display device employing the TFT substrate such as the organic EL, etc.

Figure 14:
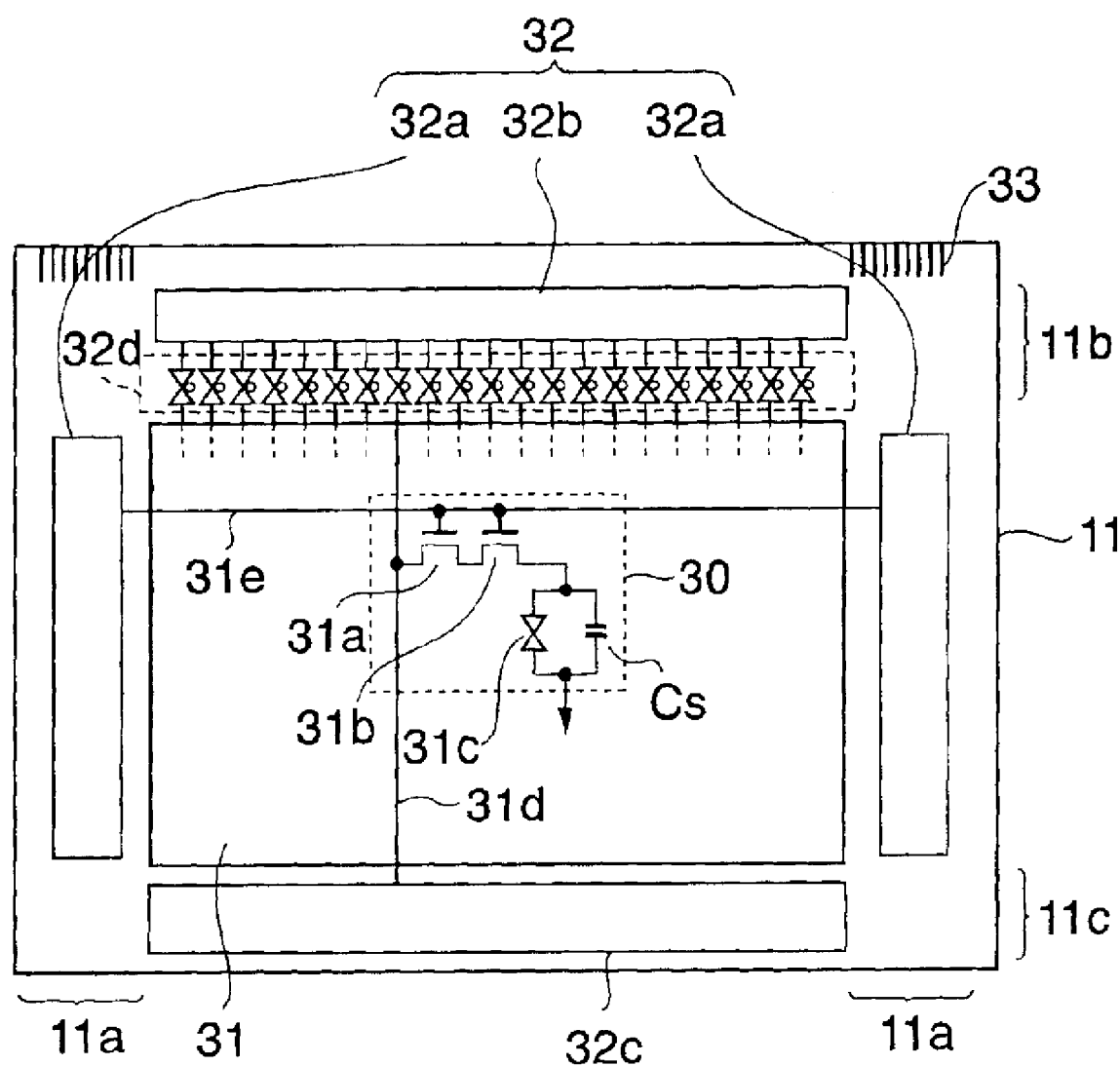
FIG. 14 is a plan view showing a configuration of a liquid crystal display device according to a fourth embodiment of the present invention.

FIG. 14 is a schematic view showing a low-temperature polysilicon liquid crystal display device according to the fourth embodiment.

Figure 16:
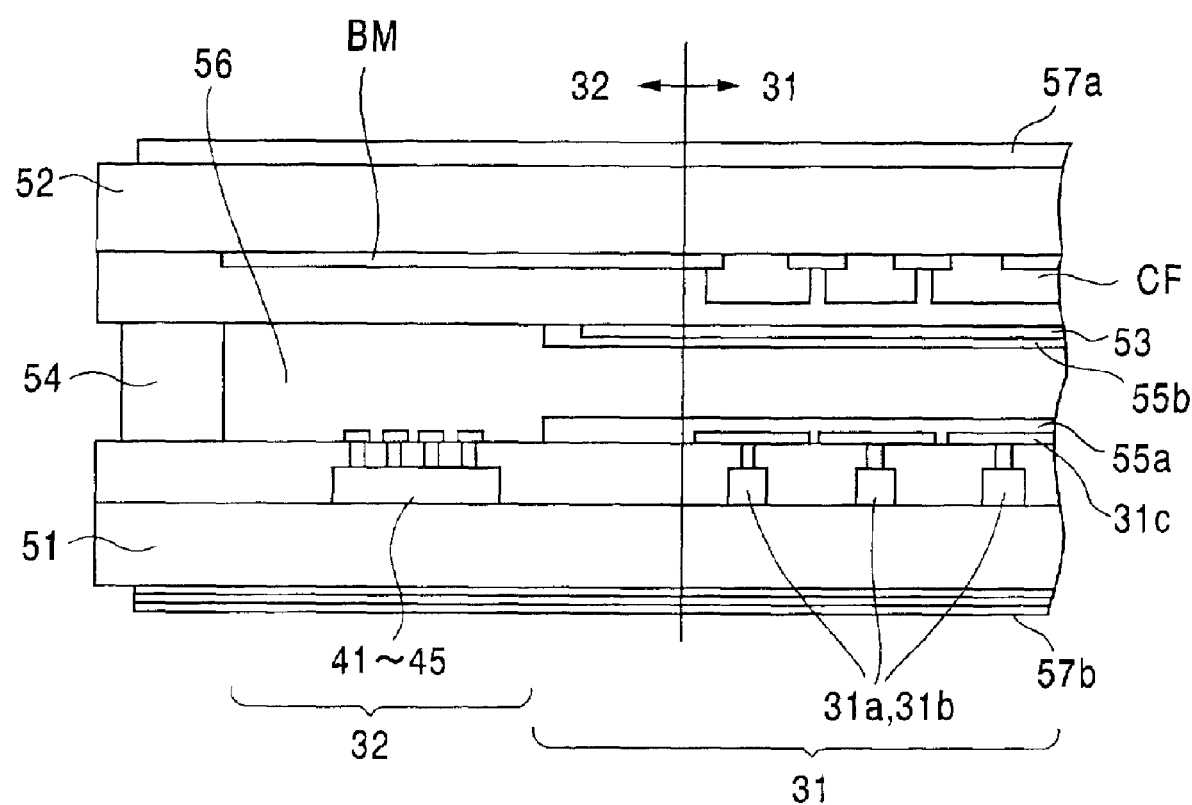
FIG. 16 is a sectional view showing a frame region and its peripheral portion of the liquid crystal display device according to the fourth embodiment of the present invention.

The liquid crystal display device shown in FIG. 16 consists of three portions of a display portion 31 having a plurality of pixel cells, a peripheral circuit portion 32, and an input terminal portion 33.

The display portion 31 has a plurality of pixel cells 30 each consisting of double-gate TFTs 31a, 31b, a pixel electrode 31c connected to one source electrodes of the double-gate TFTs 31a, 31b and a storage capacitance Cs. These pixel cells 30 are arranged in a matrix fashion. Also, the display portion 31 has gate bus (signal) lines 31e that are connected to the gate electrodes of the TFTs 31a, 31b and arranged horizontally to select the pixel TFTs, data bus (data scanning) lines 31d that are connected to the drain electrodes of the TFTs 31a to transmit the data signal to the pixel cells 31, etc.

For example, in the UXGA format display portion 31, the total number of the pixel cells 30 is 4800×1200, the total number of the gate bus lines 31e is 1200, and the total number of the data bus lines 31d is 4800.

The peripheral circuit portion 32 is formed in the frame region around the display portion 31 on the glass substrate 11, and consists of scanning side circuits 32a, a digital data driver circuit 32b, an electrostatic preventing/repairing/precharging circuit 32c, etc.

The scanning side circuits 32a are arranged in the frame regions 11a on the right/left sides of the display portion 31, and has a circuit configuration to generate a signal for selecting the gate bus line 31e. Also, the digital data driver circuit 32b is arranged in the frame region 11b on the upper side of the glass substrate 11, and has a circuit configuration to convert a digital video signal being input from the input terminal portion 33 into an analog tone signal and then transmit the data to the display portion 31 at a predetermined timing. An analog switch column 32d is formed between the display portion 31 and the digital data driver circuit 32b.

The electrostatic preventing/repairing/precharging circuit 32c is arranged in the frame region 11c on the lower side of the display portion 31.

Also, the input terminal portion 33 consists of a group of input terminals connected to two locations (ports). Then, 24 or 48 digital signal lines are provided in each port, and various control signal terminals for driving the scanning side circuits 32a are provided in each port.

The CMOS inverters 40, 41, etc. shown in the first or second embodiment are applied to the scanning side circuits 32a or the digital data driver circuit 32b. The CMOS analog switches 44, 45 in the third embodiment of the present invention are applied to the analog switch column 32d on the data side.

Figure 15:
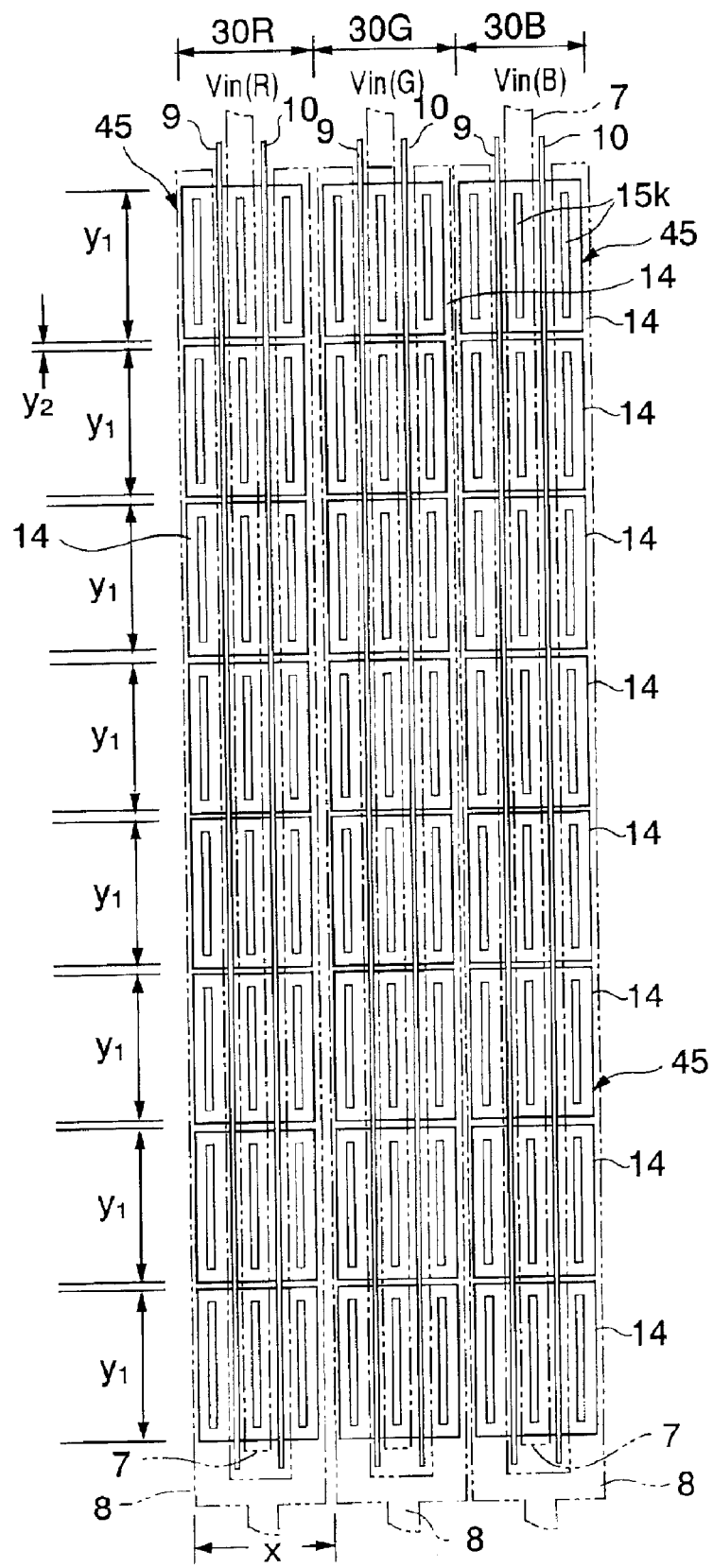
FIG. 15 is a plan view showing a device constituting an data side analog switch columns of the liquid crystal display device according to the fourth embodiment of the present invention.

FIG. 15 is a plan view showing a layout of the data side analog switch columns 32d that correspond to the red color pixel 30R, the green color pixel 30G, and the blue color pixel 30B. Three system CMOS analog switch 45 that corresponds to three data bus lines 31d is illustrated. The data buses 31d are connected to the output wiring 8 of the CMOS analog switch 45. Three-column analog switches corresponding to respective pixels 30R, 30G, 30B are constructed in parallel by eight CMOS TFTs each having a channel width $y_1$ of 100 μm, for example, respectively. Also, an interval $y_2$ between the CMOS analog switches 45 in each column is set to 5 μm, for example.

A pixel pitch x between respective pixels 30R, 30G, 30B in the analog switch column is different according to the display format. In the case of the display precision of 238 dpi, the pixel pitch x is 35.5 μm. According to the application of the present invention, since the width of one CMOS TFT becomes narrower than the prior art, the margin for the width of the CMOS TFT formed every pixel pitch x can be reduced small.

The analog tone signals Vin(R), Vin(G), Vin(B) that are supplied from the analog output buffer (not shown) of the digital data driver circuit 32b to the input wiring 7 of the CMOS TFT are output to the output wiring 8, i.e., the data bus line 31d, via the CMOS analog switch 45 in response to the block selection signals Vgn, Vgp that control the timing, and then converted into the light video signal, that is visible to the human being, by the electro-optic converting function of the liquid crystal cells 30.

FIG. 16 is a panel sectional view of the low-temperature polysilicon liquid crystal display device.

In FIG. 16, the liquid crystal display device comprises the display portion 31 having the pixel TFTs 31a, 31b and the pixel electrode 31c, a TFT substrate 51 having the peripheral circuit 32 to which the CMOS inverters 40, 41, the CMOS analog switches 42 to 45, etc. are provided, an opposing substrate 52 on which a black matrix BM, a color filter CF, an opposing electrode 53, etc. are formed, a sealing 54 for forming a cell gap between both substrates 51, 52, alignment films 55a, 55b formed on both substrates 51, 52 corresponding to the display portion 31, and a liquid crystal material 56 put between both substrates 51, 52. Also, optical films such as polarization plates 57a, 57b, etc. are formed on the outside of the TFT substrate 51 and the outside of the opposing substrate 52 respectively.

According to the fourth embodiment, since the CMOS TFT and its circuit disclosed in the first to third embodiments are employed, the high performance TFT integrated circuit can be arranged in the narrow region which corresponds to the pixel pitch in the ultra high-definition display device and in which the peripheral circuit 32 is formed. As a result, the liquid crystal display device or the organic EL display device, in which the high performance peripheral circuit is built, can be accomplished.

As described above, according to the present invention, since the n-type TFT and the p-type TFT employed in the CMOS circuit are formed in the same island-like semiconductor layer, the margin region required in adding the impurity can be eliminated. Therefore, the occupied area of the semiconductor circuit made of TFTs can be reduced.

Also, according to the present invention, since at least ones of the mutually adjacent impurity introducing regions of the n-type TFT and the p-type TFT formed in the same pattern region are shared to contact, the design area of the CMOS circuit can be much more reduced.

Accordingly, since the high performance/multiple function large-scale semiconductor integrated circuits such as the digital driver, DAC, the memory, the I/O circuit, the data processing circuit, CPU, etc. can be built in the ultra high-definition display device, the high performance display device can be manufactured. Also, since the semiconductor integrated circuit can be housed in the narrow peripheral frame region of the display device, the narrower frame, the lighter weight, and the compactness of the display device in which the peripheral circuit is integrally formed can be achieved. In addition, even if the manufacturing equipment with the relatively low processing precision is employed, the relatively high integration density can be obtained and therefore the significant reduction in the production cost of the display device in which the peripheral circuit is integrally formed can be achieved.

What is claimed is:

1. A display device comprising:
   a semiconductor layer formed on an insulating substrate like an island;
   a first gate electrode of a first MOS transistor formed on the semiconductor layer via a gate insulating film;
   a second gate electrode of a second MOS transistor formed on the semiconductor layer via the gate insulating film at a distance from the first gate electrode;
   first and second one conductivity type impurity introduced regions formed in the semiconductor layer on both sides of the first gate electrode to serve as source/drain of the first MOS transistor; and
   first and second opposite conductivity type impurity introduced regions formed in the semiconductor layer on both sides of the second gate electrode to serve as source/drain of the second MOS transistor, whereby one of the first and second opposite conductivity type impurity introduced regions is formed to mutually contact the second one conductivity type impurity introduced region,
   wherein the second one conductivity type impurity introduced region and the first opposite conductivity type impurity introduced region that contacts the second one conductivity type impurity introduced region are formed to engage alternatively along extending directions of the first and second gate electrodes, and a boundary portion between the second one conductivity type impurity introduced region and the first opposite conductivity type impurity introduced region is extended like the teeth of a comb.

2. A display device according to claim 1, wherein an impurity concentration of at least one of the first and second one conductivity type impurity introduced regions and the first and second opposite conductivity type impurity introduced regions is in excess of $1\times10^{19}/cm^3$.

3. A display device according to claim 1, further comprising:
an insulating film for covering the first MOS transistor and the second MOS transistor;
a first hole formed in the insulating film on the second one conductivity type impurity introduced region;
a second hole formed in the insulating film on the first opposite conductivity type impurity introduced region that comes into contact with the second one conductivity type impurity introduced region; and
a wiring formed on the insulating film such that the wiring is ohmic-connected to the second one conductivity type impurity introduced region via the first hole and is ohmic-connected to the first opposite conductivity type impurity introduced region via the second hole.

4. A display device according to claim 3, wherein the wiring is formed of metal.

5. A display device according to claim 1, further comprising:
an insulating film for covering the first MOS transistor and the second MOS transistor;
a hole formed on a boundary between the second one conductivity type impurity introduced region and the first opposite conductivity type impurity introduced region that contacts to the second one conductivity type impurity introduced region; and
a wiring formed on the insulating film such that the wiring is ohmic-connected to the second one conductivity type impurity introduced region and the first opposite conductivity type impurity introduced region via the hole.

6. A display device according to claim 5, wherein the hole is formed in plural or the hole is formed like a slit.

7. A display device according to claim 5, wherein the wiring is formed of metal.

8. A display device according to claim 5, wherein the hole formed like the slit is formed at positions at which the second one conductivity type impurity introduced region and the first opposite conductivity type impurity introduced region are connected alternatively along its extending direction.

9. A display device according to claim 1, wherein the first MOS transistor and the second MOS transistor constitute a peripheral driving circuit or a signal processing circuit formed in a periphery of a display portion on the insulating substrate.

10. A display device according to claim 1, wherein the semiconductor layer is formed of a low-temperature polysilicon layer.

11. A display device manufacturing method comprising the steps of:
forming an amorphous semiconductor layer on an insulating substrate;
changing the amorphous semiconductor layer into a crystalline semiconductor layer by irradiating a laser beam onto the amorphous semiconductor layer or by annealing the amorphous semiconductor layer;
patterning the crystalline semiconductor layer into an island-like shape;
forming a first gate electrode of a first MOS transistor and a second gate electrode of a second MOS transistor on a first region and a second region of the island-like crystalline semiconductor layer via a gate insulating film respectively;
forming first and second one conductivity type impurity introduced regions serving as source/drain of the first MOS transistor by introducing one conductivity type impurity into the first region of the crystalline semiconductor layer on both sides of the first gate electrode;
forming first and second opposite conductivity type impurity introduced regions serving as source/drain of the second MOS transistor by introducing opposite conductivity type impurity into the second region of the crystalline semiconductor layer on both sides of the second gate electrode, whereby the first opposite conductivity type impurity introduced region is formed adjacently to the second one conductivity type impurity introduced region; and
forming an insulating film on the first MOS transistor and the second MOS transistor;
forming a first hole separately in the insulating film in the second one conductivity type impurity introduced region and the first opposite conductivity type impurity introduced region, or forming a second hole in the insulating film to extend over both the second one conductivity type impurity introduced region and the first opposite conductivity type impurity introduced region; and
forming a wiring, which is connected to the second one conductivity type impurity introduced region and the first opposite conductivity type impurity introduced region via the first hole or the second hole, on the insulating film,
wherein a planar shape of a boundary portion between the second one conductivity type impurity introduced region and the first opposite conductivity type impurity introduced region that contacts the second one conductivity type impurity introduced region is extended like the teeth of a comb along extending directions of the first gate electrode and the second gate electrode.

12. A display device manufacturing method according to claim 11, wherein an impurity concentration of at least ones of the first and second one conductivity type impurity introduced regions and the first and second opposite conductivity type impurity introduced regions is in excess of $1\times10^{19}$-$cm^3$.

13. A display device manufacturing method according to claim 11, wherein the wiring is formed by forming a metal film on the insulating film and the first and second holes and then patterning the metal film.

14. A display device manufacturing method according to claim 11, wherein the first hole is formed at plural locations on the second one conductivity type impurity introduced region and is formed at plural locations on the first opposite conductivity type impurity introduced region.

15. A display device manufacturing method according to claim 11, wherein the second hole is formed like a slit, which is connected alternatively to the second one conductivity type impurity introduced region and the first opposite conductivity type impurity introduced region, along extending directions of the first gate electrode and the second gate electrode.

* * * * *